United States Patent Office 3,030,247
Patented Apr. 17, 1962

3,030,247
STABLE HEAT-CURING EPOXY RESIN
COMPOSITIONS
Joseph N. Schurb, St. Paul, Minn., assignor to Minnesota
Mining & Manufacturing Company, St. Paul, Minn., a
corporation of Delaware
No Drawing. Filed July 28, 1955, Ser. No. 525,087
8 Claims. (Cl. 154—43)

This invention is primarily concerned with thin, flexible, self-sustaining resinous sheet which is capable of being formed in rolls for storage and transportation and upon unwinding is capable of being laid up in stacked segments and converted under heat and pressure to coherent, strong, uniformly hard, void-free structural members. The novel resinous sheet comprises a flat integral layer of uniformly-distributed, non-woven, aligned and essentially contiguous, continuous filaments exclusively bonded to each other by a rapidly thermosetting resin composition which is a solvent-free blend of components consisting essentially of an epoxy resin and latent chemical hardening agent. The epoxy resin preferably is a polyglycidyl ether of a polyhydroxy compound selected from the group consisting of polyhydric phenols and polyhydric alcohols. The latent chemical hardening agent, which is present in such proportion that about $\frac{2}{3}$ to $\frac{4}{3}$ active hydrogens of hardening agent are present in the resin composition per epoxy group, includes at least 2 parts per 100 parts of epoxy resin of an N-substituted melamine of the formula:

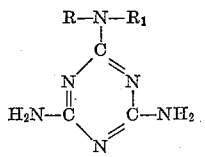

wherein R is selected from the group consisting of aryl, alkyl containing at least 2 carbon atoms, and alkenyl, the alkenyl being free from unsaturation at the carbon atom adjoining the nitrogen atom, and $R_1$ is selected from the group consisting of R and hydrogen. A preferred hardening agent is N,N-diallylmelamine having the formula:

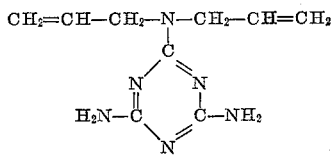

Typical epoxy resins are those which are produced by the reaction of one or more moles of epichlorhydrin or glycerol dichlorhydrin with a mole of 2,2-bis(4-hydroxyphenyl)propane, known in commerce as bisphenol A, in the presence of a base such as sodium hydroxide and at elevated temperatures within the approximate range of 50°–150° C. The resinous glycidyl polyether obtained from epichlorhydrin and bisphenol A is a complex mixture rather than a single chemical compound, which has been represented by the following general formula:

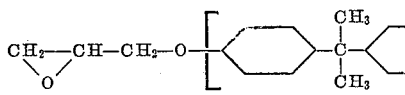

where $n$ has an average value between zero and about seven, depending for the most part on the relative proportions of bisphenol A and epichlorhydrin in the initial reaction mixture. A number of these epoxy resins are commercially available such as the Epon resins of the Shell Chemical Corporation, the Araldite resins of the Ciba Company and certain Bakelite resins of the Union Carbide and Carbon Corporation. These resins vary from the liquid state at ordinary room temperatures, for which $n$ in the above formula approaches 0, to high molecular weight solids having melting points well above 100° C.

Other polyhydric phenols, e.g. resorcinol or 2,2-bis-(4-hydroxyphenyl)butane, as well as various tris-phenols, may be substituted for the bisphenol A.

Other polyhydroxy compounds such as glycol or glycerol may be reacted with epichlorhydrin in the presence of boron trifluoride catalyst and the product converted with certain alkaline reagents to the liquid or resinous glycidyl polyether, having utility in the practice of this invention.

The chlorhydrin component likewise may be replaced by other compounds serving as equivalent reactive sources of epoxy radicals.

In all cases, the epoxy resin contains an average of more than one epoxy group,

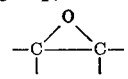

also called the oxirane group, per average molecular weight. Other liquid or resinous materials in which the average number of epoxy linkages per average molecular weight exceeds one have been produced by suitable treatment, e.g. with hydrogen peroxide and formic acid, of unsaturated materials such as soybean oil, copolymers of butadiene with styrene, acrylonitrile, or acrylic acid, etc.; and these materials likewise, e.g. in admixture with the epoxy resins, have utility for the purposes of the invention. The preparation of these and equivalent epoxy-containing materials has been adequately described elsewhere and forms no part of the present invention.

Epoxy resins as described are by themselves permanently thermoplastic and ordinarily require the addition of cross-linking agents or other reactive materials before they can be cured to hard, infusible resinous products. The chemical hardening agents may react with the epoxy resins at their epoxy groups or the reaction may involve the hydroxyl groups, or both.

The N-substituted melamines described hereinabove provide epoxy resin systems of long shelf life and yet, unlike some other latent chemical hardening agents, are highly compatible with the resin at moderately elevated temperatures and so produce uniformly cured resinous products. These attributes of good compatibility coupled with long shelf life are carried over into thermosetting epoxy compositions incorporating other latent curing agents which by themselves provide cured epoxy resin products of less uniformity. For example, N,N-diallylmelamine when mixed in substantial proportions with dicyandiamide produces a more uniformly cured resinous product than does the dicyandiamide alone while the use of the lower cost dicyandiamide provides improved economy. The substituted melamines of this invention are also useful as curing agents for epoxy resin in combination with carboxylic acyl hydrazides which may be represented by the following formula:

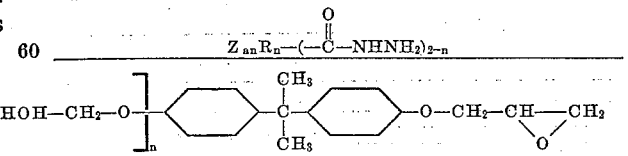

wherein R is a polyvalent organic radical having $v$ valences, $n$ is a member of the group consisting of zero and the integer 1, each Z is a member of the group consisting of the amino, hydroxyl, and carboxylic acyl hydrazide radicals, and $a$ is equal to $v-1$. Both in admixture with the hydrazides and with dicyandiamide, the attributes of prolonged shelf life and good pot life are retained by the thermosetting epoxy resin compositions as is the ability of the compositions to become thermoset in a short time at moderately elevated temperatures.

The preparation of the substituted melamines having utility in this invention is well known and forms no part of the invention. Among those suitable for use in the invention are N-ethylmelamine, N,N-diethylmelamine, N-butylmelamine, N-phenylmelamine, and N-ortho-phenylphenylmelamine.

As a curing agent for epoxy resin, it has been determined that diallylmelamine is preferably used in the proportion of about ¼ mole of diallylmelamine per epoxide equivalent of the resin and that a ⅙ mole proportion does not effectively cure the resin. From this, it may be theorized that the four active hydrogens of the two amino groups on the melamine ring react with the free epoxy groups of the resin and that the olefinic bonds in the allyl radicals do not enter into reaction with the epoxy groups. Where a fifth active hydrogen is present as in mono-substituted melamines, this hydrogen is ordinarily somewhat less reactive than the other four due to steric hindrance but probably also reacts with an epoxy group of the resin to allow a proportionate reduction in the amount of substituted melamine preferably present in a thermosetting composition.

An epoxy resin having a melting point of 40°–45° C. as determined by the Durrans' Mercury Method and an epoxide value of about 0.29 equivalents per 100 grams of resin and prepared from epichlorhydrin and bisphenol A at a mole ratio of approximately 2 to 1 is available at the filing date of this application as Epon resin No. 864.

Several samples of the epoxy resin were mixed with various amounts of diallylmelamine in order to determine the optimum proportion of these components in a thermosetting mixture. In each case the epoxy resin was heated to about 105° C. in a high speed mixer and the diallylmelamine was added slowly as a fine powder with mixing. After a homogeneous blend was obtained, the sample was poured into an aluminum cup and placed in an oven preheated to 165° C.

A sample containing 5 parts diallylmelamine to 100 parts epoxy resin was only partially cured even though held in the oven for 2 hours at 165° C. A sample containing 10 parts diallylmelamine to 100 parts epoxy resin was cured after 2 hours, but the casting was brittle at room temperature and soft at the cure temperature. Samples containing 15 and 20 parts of diallylmelamine per 100 parts resin were both cured to hard, tough, strong solids in 25 minutes. Of the two, the sample containing 15 parts diallylmelamine appeared to be superior.

Another set of castings was prepared from the same epoxy and diallylmelamine in varying amounts. Each composition was cured for 19 hours at 150° C. except sample #1 was cured for only 18 hours. The castings were tested for tensile strength, elongation and hardness, the hardness measurements being taken with the Barcol hardness tester. The data obtained is noted in Table A, all parts being given by weight.

TABLE A

| Ingredients | Samples | | | |
|---|---|---|---|---|
| | #1 | #2 | #3 | #4 |
| Epoxy resin | 100 | 100 | 100 | 100 |
| Diallylmelamine | 10 | 15 | 20 | 30 |
| Tensile strength in p.s.i. | 8,120 | 8,350 | 8,070 | 4,910 |
| Elongation in percent | 4.8 | 4.7 | 4.6 | 2.8 |
| Hardness (Barcol at room temperature) | 28.0 | 28.3 | 30.2 | 29.3 |

While the tensile strength of diallylmelamine-cured epoxy resin is not as great as the products of many other epoxy resin compositions, it is satisfactory for most purposes and serves to indicate the preferred proportion of diallylmelamine in the resinous composition. In a composition of 100 parts of the epoxy resin of this example and 15 parts diallylmelamine, about ¼ mole of diallylmelamine is present per epoxide equivalent of resin. It should be noted that the same epoxy resin cured with phthalic anhydride in optimum proportions produces castings of slightly greater tensile strength than the casting obtained using sample #2. However, diallylmelamine-epoxy resin compositions have several highly useful properties not possessed by epoxy resin compositions including anhydrides as will be shown in some detail below.

*Example I*

A blend of 100 parts of epoxy resin such as Epon resin No. 864 and 15 parts diallylmelamine were placed in a dip pan and heated to about 95° C. A large number of lineally aligned, continuous glass filaments, viz. 200 ends per inch or a total of 2000 ends of untwisted or lightly twisted "Fiberglas" yarn of starch mineral oil finish, i.e.

$$150\frac{1}{0}$$

Owens-Corning 630–P finish, each containing 204 strands of continuous glass filament having a diameter of 0.00038 inch, were fed under uniform tension through the dip pan at the rate of about 4 yards per minute and then passed through squeeze rollers to shape the reinforced web thus created into a ten inch wide, 0.01 inch thick sheet comprising about 55 percent by weight of glass filaments. The reinforced web, upon leaving the rollers, quickly cooled to a slightly tacky surface condition sufficient to adhere it to a paper liner having a low adhesion coating. The web and liner were then rolled together for convenient storage or shipment.

Twelve sheets of this web were laid in a heated press with the direction of filaments in each sheet offset 90° from those of adjacent sheets. The temperature was elevated to 165° C. for about 4 minutes before pressure was applied and then held for an additional 21 minutes at 160° C. under 25 pounds per square inch. The structural laminate thus formed measured about ⅛ inch in thickness.

It should be pointed out that when the temperature of the sheets of web is first elevated to 165° C., the viscosity of the resinous composition is substantially lowered so that the application of pressure at this time would cause the resin to flow out of the sides of the press. Accordingly, the platens of the heated press are initially just brought into contact with the sheets of web. After the resinous composition gels, pressure is applied to insure the ejection of air as well as to insure maximum heat transfer between the platens and the laminate.

After cooling, four test bars were cut from the laminate in the direction of the fibers of half of the webs in the laminate, and each was subjected to the flexural test described in Method 1031 of Federal Specification L–P–406b. Another four test bars cut in the same direction were placed in boiling water for two hours and, after cooling, subjected to the same flexural test. The average test results are noted in Table B below in comparison to average results of the same number of samples prepared with the same glass web and in the same manner but using 100 parts of the same epoxy resin cured with 35 parts phthalic anhydride, which proportion of phthalic anhydride has been found to produce the best results although it is somewhat less than the equivalent ratio of anhydride groups to free epoxy radicals in the resin.

A set of four test bars of each of the cured reinforced webs was subjected to tensile tests according to the procedure outlined in Method 1011 of Federal Specification L–P–406b while another four bars were placed in boiling water for two hours and after cooling tested in the same fashion. The results are also noted in Table B.

TABLE B

| Ingredients | Sample #5 | Sample #6 |
| --- | --- | --- |
| Epoxy resin | 100 | 100 |
| Diallylmelamine | 15 | |
| Phthalic anhydride | | 35 |
| Flexural strength in p.s.i. | 77,500 | 90,000 |
| Flexural strength after two hour boil | 78,000 | 32,000 |
| Tensile strength in p.s.i. | 58,200 | 63,500 |
| Tensile strength after two hour boil | 55,100 | 53,500 |

Diallylmelamine is the only curing agent for epoxy resin known to the inventor which can be used in the manufacture of glass-filament-reinforced resinous webs, the cured laminates of which are not appreciably affected after two hours in boiling water, where the glass filaments have a starch mineral oil finish. Other finishes for the glass filaments have been developed which, in conjunction with a variety of thermoset epoxy resin compositions, withstand the water boil test satisfactorily. For example, using Owens-Corning 60 end #863 hard "Volan" finish rovings as the glass reinforcement and building up a ⅛ inch laminate by placing each of 12 plies with its glass filaments running at an angle of 60° from those of adjacent filaments, the data noted in Table C was secured. Each test again reflects the average of four test bars and was made in accordance with the above-cited Federal Specification L-P-406b. The epoxy resin was that used in Example I. All parts are given by weight. It should be noted that exhaustive tests show that lineally-aligned glass reinforced laminates prepared with each layer rotated 60° from the preceding layer have nearly isotropic qualities so that test bars may be cut in random directions.

TABLE C

| Ingredients | Sample #7 | Sample #8 |
| --- | --- | --- |
| Epoxy resin | 100 | 100 |
| Diallylmelamine | 15 | |
| Phthalic anhydride | | 35 |
| Flexural strength in p.s.i. | 60,500 | 64,500 |
| Flexural strength after two-hour boil | 58,200 | 62,300 |

While glass reinforced structural sheet material made with epoxy resin using phthalic anhydride as a curing agent is somewhat stronger both in tensile and flexural properties, the uncured anhydride-containing sheets must be refrigerated for storage, or they will advance to a state rendering them unsuitable for the purposes for which they are intended. Even when stored at 5° C., the webs must be cured within two or three months.

On the other hand, reinforced sheet material comprising epoxy resin and diallylmelamine can be stored at room temperatures for more than six months and then be used to make structural laminates equal in quality to those fabricated out of freshly prepared sheet material. However, after about a month, the uncured sheet material loses its surface tack and becomes somewhat difficult to handle at room temperatures. This can be avoided by refrigerating the web to about 5° C., at which temperature it remains flexible and slightly tacky for at least six months. It should be noted that thermosetting resinous compositions have been found to have a longer shelf life when stored as thin films, e.g., in glass reinforced webs, than when stored in large batches.

Example II

Six layers of the glass reinforced web of sample #7 of the preceding example were laid together with the glass filaments in alternate sheets aligned at an angle of 60° to each other and with a sheet of 1.7 mil thick copper placed on top. This stack of sheets was placed together in a heated platen press for 4 minutes at 165° C. before pressure was applied and for an additional 21 minutes at 165° C. under 25 pounds per square inch pressure.

A number of one inch wide test pieces were cut from this laminate crosswise to the yarn of the resinous web adjacent the copper sheet and the copper was peeled away at one end with a knife. Weights were fastened to the loose end of copper to measure the peel strength. The copper sheet first moved under a weight of 6.5 to 7 pounds and peeled entirely away under a weight of 7.2 to 7.6 pounds. A one inch wide test panel cut with the yarn of the top layer running longitudinally was also subjected to the test. The copper began to peel under 6.8 pounds and peeled away under 7.6 pounds.

By way of comparison, the printed circuit industry has heretofore largely utilized phenolic resins secured to copper by a separate adhesive. Panels so made invariably fail at less than 3 pounds in this peel test. As a further comparison, copper-to-reinforced resinous laminates identically prepared except using dicyandiamide instead of diallylmelamine had a peel strength of less than three pounds.

A number of test pieces of the resin-glass-copper laminate, first wiped with a rag dampened with silicone oil to prevent solder from sticking to the copper, were dropped face down for a period of ten seconds on molten solder at varying temperatures. When the solder was below 315° C., no change in the laminate was observable. At 315° C., at slight darkening of the resin was detachable. When the temperature of the solder was elevated to the range of 340° to 370° C., a definite change in peel strength was noted. At 400° C., delamination occurred.

The test has been widely accepted in printed circuit industry as a measure of the quality of circuit boards. Since soldering is ordinarily accomplished at or below about 205° C., which temperature is rarely maintained as long as ten seconds, the above-described test is very severe. For comparison, phenolic resin-copper laminates generally blow apart when dropped into solder at 205° C. for ten seconds.

Example III

Twelve layers of the glass reinforced web of sample #7 of Example I were piled together and heated slightly to become pliable. They were then formed in matched-metal dies to simulate the leading wing edge of a high speed aircraft and cured for 25 minutes at 165° C., initially without the application of pressure and after 4 minutes under 25 pounds per square inch. The cured laminate was subjected to attack by a simulated rainfall of one inch per hour at 500 miles per hour. Also subjected to the test were a similarly prepared glass reinforced laminate, in which the resin was an epoxy resin-phthalic anhydride composition, and a laminate prepared from woven glass cloth impregnated with a polyester base resin. The results of the tests are noted in Table D below.

TABLE D

| Type Laminate | Initial Erosion | Erosion through approx. 15 mils | Erosion through ⅛" laminate |
| --- | --- | --- | --- |
| Polyester | 15 sec. | 1 min. | 5 min. |
| Epoxy resin-phthalic anhydride | 1 min. | 7 min. | 30 min. |
| Epoxy resin-diallylmelamine | 2 min. | 25 min. | 70 min. |

Other test results not reproduced here indicate that laminates prepared using linearly aligned glass filaments are not superior in regard to rain erosion to laminates using woven glass cloth impregnated with the same resinous composition.

In view of the fact that polyester-resin-impregnated glass cloth has achieved widespread acclaim as a material having extreme toughness and durability, particularly in the construction of boats, automobile bodies and structural building panels, the greatly increased resistance to rain erosion realized using the compositions of this invention is of utmost significance. The marked improvement over the phthalic anhydride-epoxy resin composition should also be noted and contrasted to the slight advantage possessed by the anhydride composition in flexural strength set out in Table C above.

The substituted melamines utilized in this invention together with the hydrazides and dicyandiamide comprise the only curing agents for epoxy resin known to the inventor which may be mixed with the resin and stored for prolonged periods at room temperature without the resin being cured to any appreciable extent by the curing agent.

It has now been found that epoxy resin can be mixed with diallylmelamine together with either a hydrazide or dicyandiamide and the mixture used to impregnate lineally aligned glass filaments. After prolonged storage at room temperatures the web can be used to prepare structural laminates or other useful cured products which are superior in certain respects to cured reinforced resinous compositions incorporating only one of these curing agents.

*Example IV*

The epoxy resin used in this example had a melting point of 20°–28° C. as determined by the Durrans' Mercury Method and an epoxide value of about 0.38 equivalents per 100 grams of resin and was prepared from epichlorhydrin and bisphenol A at a mole ratio of approximately 2.6 to 1. Such a resin is presently marketed under the trade name Epon No. 834.

Two glass reinforced webs were made with the above-described epoxy resin following the procedure outlined in Example I except using the ingredients outlined in Table E below with Owens-Corning glass filaments known as 60 end, #863 hard "Volan" finish rovings. Each web contained a glass concentration of 195 ends per inch of width, which glass comprised about 60 percent by weight of the web. Each web was used to make a ⅛ inch, 15-ply laminate with the filaments in each ply laid 60° with those of adjacent plies. The laminates were cured for 25 minutes at 165° C., the last 21 minutes under 25 pounds per square inch. Four test bars were cut from each laminate, and the average flexural strength of each is noted as follows:

TABLE E

| Ingredients | Sample #9 | Sample #10 |
|---|---|---|
| Epoxy resin | 100 | 100 |
| Adipyl dihydrazide | 16 | 10 |
| Diallylmelamine | | 5 |
| Flexural strength in p.s.i. | 62,200 | 60,530 |

While the flexural strength of the panel prepared using sample #10 is slightly less than that prepared from sample #9, the former laminate was found to be superior because it had a uniform cure whereas the panel prepared from straight adipyl dihydrazide was not well cured at the edges as evidenced by wide variations in hardness over its surface.

Some of the uncured glass reinforced sheet material prepared as described above and containing as the resinous impregnant, the composition of sample #10, has been stored for more than two months at room temperatures without noticeable loss in flexibility, handling qualities or surface tack.

The pot life of samples #9 and #10 was tested at 95° C. and found to be substantially the same in each case, that is, between two and three hours before the viscosity advanced to a degree such that the glass on being drawn through the dip pan would not become saturated with the resinous composition.

Castings were prepared using two different proportions of diallylmelamine and adipyl dihydrazide to cure the epoxy resin of Example I, e.g. Epon resin No. 864. The compositions of each are listed in Table F below.

TABLE F

| Ingredients | Sample #11 | Sample #12 |
|---|---|---|
| Epoxy resin | 100 | 100 |
| Adipyl dihydrazide | 16 | 10.2 |
| Diallylmelamine | 2.4 | 6.4 |

The castings were placed in an oven preheated to 165° C. The casting using sample #11 gelled after about 10 minutes and that prepared with sample #12 after about 8½ minutes. Each was fully cured to an essentially clear solid after a total of 30 minutes at 165° C., but the casting from sample #11 appeared to contain flecks of uncured material, a tendency of castings prepared using dihydrazide-epoxy resin compositions. However, the other casting appeared to be entirely homogeneous.

The tendency of dihydrazide-epoxy resin compositions to produce heat-cured castings containing flecks of uncured material can be averted by thorough mixing. In applications wherein careful mixing procedures are not feasible and homogeneous cured products are required, the addition of a substantial proportion of diallylmelamine is indicated. Since diallylmelamine is more expensive than adipyl dihydrazide, this test indicates that a composition including as the curing agent for epoxy resin a combination of adipyl dihydrazide and diallylmelamine would preferably contain slightly less than two parts of the dihydrazide per part by weight of diallylmelamine.

The same compositions were tested for gel times as impregnants in glass reinforced laminates in which the resinous composition comprised about 40 percent by weight of the laminate. In each case, 15 sheets of uncured web were placed in a press, the platens of which were preheated to 165° C., and the platens were brought into contact with the stack of sheets without pressure being applied. The resinous composition of sample #11 gelled in about 3 minutes while that of sample #12 gelled in about 2½ minutes. After each composition had gelled, a pressure of 25 pounds per square inch was applied and the heating continued for a total of 25 minutes. Each cured laminate had a thickness of about ⅛ inch. The laminate prepared using sample #12 was found to be superior in point of uniformity of cure to that prepared with sample #11.

The substantially shortened gel time of the same resinous composition when cured in a glass reinforced laminate as compared to the curing of castings is believed to be due to the more efficient heat transfer in that the heat source is in physical contact with the resin.

It should be pointed out that in using a mixture of the substituted melamines of this invention and a carboxylic acyl dihydrazide to cure epoxy resin, the two hardening agents may be either premixed and then blended together into the epoxy resin or the three components may be mixed together at one time or in any order. This flexibility in procedure is also available in using combinations of the substituted melamines and dicyandiamide to cure epoxy resin.

*Example V*

Glass reinforced webs were prepared using the formulations shown in Table G below but were otherwise the same as the sheet material of Example IV. The epoxy resin used was that described in Example IV e.g., Epon No. 834. Test panels were fabricated as described in Example IV except that the curing lasted 35 minutes at 165° C. The average flexural strength of four test bars cut from each panel is shown below.

TABLE G

| Ingredients | Sample #13 | Sample #14 |
|---|---|---|
| Epoxy resin | 100 | 100 |
| Dicyandiamide | 12 | 5.3 |
| Diallylmelamine | | 5.3 |
| Flexural strength in p.s.i. | 67,000 | 67,700 |

Here, the panel prepared using sample #14 was preferred to that prepared from sample #13 because of greater uniformity of cure, without regard to its slightly greater flexural strength. The variation in hardness over the surface was even more pronounced in the panel prepared with dicyandiamide, sample #13, than it was with adipyl dihydrazide, sample #9, but the dicyandiamide-diallylmelamine combination of sample #14 had almost uniform surface hardness.

An uncured sheet of the glass-reinforced web incorporating the composition of sample #14 was stored at room temperatures for more than three months, after which time it appeared unchanged in flexibility and surface tack.

Both samples #13 and #14 were checked for pot life at 95° C., and each was found to retain sufficiently low viscosity for more than 3 hours to saturate the glass.

A casting was prepared using four parts diallylmelamine and four parts dicyandiamide per 100 parts of the epoxy resin of Example I, e.g. Epon No. 864, and compared to a casting of the same resin cured with straight dicyandiamide. The latter casting required about 30 minutes in an oven at 165° C. before completely gelling while the combined curing agents produced a gel after 7 or 8 minutes. It is believed that a large proportion of the dicyandiamide settled out of the straight epoxy resin-dicyandiamide composition to result in the slow gel time, which settling out apparently did not occur when diallylmelamine was present.

It should be pointed out that any shortening in the time required to cure glass reinforced laminates is of great commercial importance and that the gel time is a prime factor, if only because it regulates the time of application of pressure, which in turn allows the resin to be more efficiently and uniformly heated.

What is claimed is as follows:

1. A stable composition of matter having a prolonged shelf life at normal room temperatures and capable of rapidly curing to a uniformly hard, tough state at moderately elevated temperatures, comprising a blend of (1) an epoxy resin having an average of more than one 1,2-epoxy group per average molecular weight and (2) compatible latent chemical hardening agent for epoxy resin in such proportion that about ⅔ to ⅘ active hydrogens of hardening agent are present in the resin composition per epoxy group, said hardening agent being a mixture of (a) a member of the group consisting of dicyandiamide and polyfunctional carboxylic acyl hydrazide and (b) at least about 2 parts per 100 parts epoxy resin of a compatible polyfunctional hardener compound of the formula:

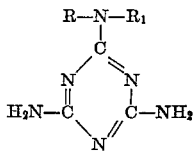

wherein R is selected from the group consisting of aryl, alkyl containing at least 2 carbon atoms, and alkenyl, the alkenyl being free from unsaturation at the carbon atom adjoining the nitrogen atom, and $R_1$ is selected from the group consisting of R and hydrogen.

2. A stable composition of matter having a prolonged shelf life at normal room temperatures and capable of rapidly curing to a uniformly hard, tough state at moderately elevated temperatures, comprising a blend of (1) an epoxy resin having an average of more than one 1,2-epoxy group per average molecular weight, and (2) compatible latent chemical hardening agent for epoxy resin in such proportion that about ⅔ to ⅘ active hydrogens of hardening agent are present in the resin composition per epoxy group, said hardening agent being a mixture of (a) polyfunctional carboxylic acyl hydrazide and (b) at least about 2 parts per 100 parts epoxy resin of a compatible polyfunctional hardener compound of the formula:

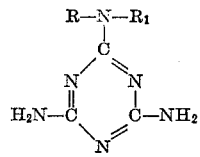

wherein R is selected from the group consisting of aryl, alkyl containing at least 2 carbon atoms, and alkenyl, the alkenyl being free from unsaturation at the carbon atoms adjoining the nitrogen atom, and $R_1$ is selected from the group consisting of R and hydrogen.

3. A stable composition of matter having a prolonged shelf life at normal room temperatures and capable of rapidly curing to a uniformly hard, tough state at moderately elevated temperatures, comprising a blend of (1) an epoxy resin having an average of more than one 1,2-epoxy group per average molecular weight, and (2) compatible latent chemical hardening agent for epoxy resin in such proportion that about ⅔ to ⅘ active hydrogens of hardening agent are present in the resin composition per epoxy group, said hardening agent being a mixture of (a) dicyandiamide and (b) at least about 2 parts per 100 parts epoxy resin of a compatible polyfunctional hardener compound of the formula:

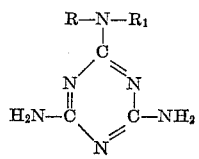

wherein R is selected from the group consisting of aryl, alkyl containing at least 2 carbon atoms, and alkenyl, the alkenyl being free from unsaturation at the carbon atoms adjoining the nitrogen atom, and $R_1$ is selected from the group consisting of R and hydrogen.

4. As a new product of manufacture, a thin, flexible, self-sustaining resinous sheet capable of being formed in rolls for storage and transportation and upon unwinding being capable of being laid up in stacked segments and converted under heat and pressure to coherent, strong, uniformly hard, void-free structural members, said resinous sheet comprising a flat integral layer of uniformly-distributed, non-woven, aligned and essentially contiguous, continuous filaments exclusively bonded to each other by a rapidly thermosetting resin composition which is a solvent-free blend of components consisting essentially of (1) an epoxy resin which is a polyglycidyl ether of a polyhydroxy compound selected from the group consisting of polyhydric phenols and polyhydric alcohols, and (2) compatible latent chemical hardening agent for epoxy resin in such proportion that about ⅔ to ⅘ active hydrogens of hardening agent are present in the resin composition per epoxy group, said hardening agent consisting of (a) at least about 2 parts per 100 parts of epoxy resin of a compound of the formula:

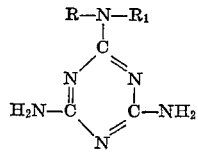

wherein R is selected from the group consisting of aryl, alkyl containing at least 2 carbon atoms, and alkenyl, the alkenyl being free from unsaturation at the carbon atom adjoining the nitrogen atom, and $R_1$ is selected from the group consisting of R and hydrogen, and (b) 0–16 parts of a member of the group consisting of dicyandiamide and polyfunctional carboxylic acyl hydrazide, said resinous sheet having a uniform caliper thickness on the order of .01 inch.

5. The strong, firmly bonded, heat-resistant laminate of a plurality of plies of the heat-cured resinous sheet defined in claim 4.

6. As a new product of manufacture, a thin, flexible, self-sustaining resinous sheet capable of being formed in rolls for storage and transportation and upon unwinding being capable of being laid up in stacked segments and converted under heat and pressure to coherent, strong, uniformly hard, void-free structural members, said resinous sheet comprising a flat integral layer of uniformly-distributed, non-woven, aligned and essentially contiguous, continuous fine glass filaments exclusively bonded to each other by a rapidly thermosetting resin composition which is a solvent-free blend of components consisting essentially of (1) an epoxy resin which is a polyglycidyl ether of a polyhydroxy compound selected from the group consisting of polyhydric phenols and polyhydric alcohols, and (2) N,N-diallylmelamine in such proportion that about ⅔ to ⅘ active hydrogens of the diallylmelamine are present in the resin composition per epoxy group, said resinous sheet having a uniform caliper thickness on the order of .01 inch.

7. The strong, firmly bonded, heat-resistant laminate of a plurality of plies of the heat-cured resinous sheet defined in claim 6 and a surface layer of copper foil which can be etched for printed circuitry.

8. As a new product of manufacture, a thin, flexible, self-sustaining resinous sheet capable of being formed in rolls for storage and transportation and upon unwinding being capable of being laid up in stacked segments and converted under heat and pressure to coherent, strong, uniformly hard, void-free structural members, said resinous sheet comprising a flat integral layer of uniformly-distributed, non-woven, aligned and essentially contiguous, continuous fine glass filaments exclusively bonded to each other by a rapidly thermosetting resin composition which is a solvent-free blend of components consisting essentially of (1) epoxy resin having an average of more than one 1,2-epoxy group per average molecular weight and (2) compatible latent chemical hardening agent for epoxy resin in such proportion that about ⅔ to ⅘ active hydrogens of hardening agent are present in the resin composition per epoxy group, said hardening agent being a mixture of (a) at least about 2 parts per 100 parts of epoxy resin of a compound of the formula:

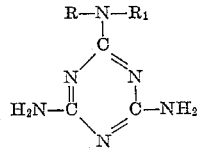

wherein R is selected from the group consisting of aryl, alkyl containing at least 2 carbon atoms, and alkenyl, the alkenyl being free from unsaturation at the carbon atom adjoining the nitrogen atom, and $R_1$ is selected from the group consisting of R and hydrogen, and (b) a member of the group consisting of dicyandiamide and polyfunctional carboxylic acyl hydrazide, said resinous sheet having a uniform caliper thickness on the order of .01 inch.

References Cited in the file of this patent

UNITED STATES PATENTS

| | | |
|---|---|---|
| 2,879,252 | Been et al. | Mar. 24, 1959 |

FOREIGN PATENTS

| | | |
|---|---|---|
| 133,819 | Australia | July 10, 1946 |
| 503,546 | Belgium | May 26, 1951 |
| 826,512 | France | Sept. 10, 1937 |